United States Patent
Ho et al.

(10) Patent No.: US 9,477,727 B2
(45) Date of Patent: Oct. 25, 2016

(54) ABSTRACTING DATA FOR USE BY A MOBILE DEVICE HAVING OCCASIONAL CONNECTIVITY

(75) Inventors: Michael Ho, Danville, CA (US); Howard Wong, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 434 days.

(21) Appl. No.: 12/503,573

(22) Filed: Jul. 15, 2009

(65) Prior Publication Data
US 2010/0030783 A1  Feb. 4, 2010

Related U.S. Application Data

(60) Provisional application No. 61/085,565, filed on Aug. 1, 2008.

(51) Int. Cl.
G06F 7/00 (2006.01)
G06F 17/30 (2006.01)

(52) U.S. Cl.
CPC ... *G06F 17/30557* (2013.01); *G06F 17/30067* (2013.01)

(58) Field of Classification Search
CPC .............................................. G06F 17/30067
See application file for complete search history.

(56) References Cited

U.S. PATENT DOCUMENTS

| | | | |
|---|---|---|---|
| 6,381,241 B1 | 4/2002 | Ghirnikar et al. | |
| 6,983,293 B2 | 1/2006 | Wang | |
| 7,130,871 B2 | 10/2006 | Acree et al. | |
| 7,467,389 B2 | 12/2008 | Mukkamala et al. | |
| 7,512,638 B2 | 3/2009 | Jhaveri et al. | |
| 7,606,838 B2 | 10/2009 | Tobies | |
| 7,620,659 B2 | 11/2009 | Novik et al. | |
| 7,660,830 B2 | 2/2010 | Ordille | |
| 7,778,962 B2 | 8/2010 | Shah et al. | |
| 7,805,420 B2 | 9/2010 | Kapoor et al. | |
| 7,853,561 B2 | 12/2010 | Holenstein et al. | |
| 7,882,062 B2 | 2/2011 | Holenstein et al. | |
| 7,962,458 B2 | 6/2011 | Holenstein et al. | |
| 8,037,056 B2 | 10/2011 | Naicken et al. | |
| 8,046,424 B2 | 10/2011 | Novik et al. | |
| 8,086,661 B2 | 12/2011 | Holenstein et al. | |
| 8,131,670 B2 | 3/2012 | I Dalfo et al. | |

(Continued)

FOREIGN PATENT DOCUMENTS

| | | |
|---|---|---|
| KR | 10-2003-0072693 A | 9/2003 |
| KR | 10-2006-0060629 A | 6/2006 |
| KR | 10-2011-0074059 A | 6/2011 |

OTHER PUBLICATIONS

Notification of Transmittal of the International Search Report and Written Opinion, dated Mar. 18, 2010, for PCT Application No. PCT/US2009/004343, 11 pages.

(Continued)

*Primary Examiner* — Loan T Nguyen
(74) *Attorney, Agent, or Firm* — Sterne, Kessler, Goldstein & Fox P.L.L.C.

(57) ABSTRACT

A system, method, and computer program product are provided for abstracting data in a remote data source. A method operates by defining the data source, defining a data synchronization methodology for communication with the data source, and providing an abstraction layer for accessing data in the data source. The abstraction layer implements the data synchronization methodology when data is accessed through the abstraction layer is presented.

22 Claims, 17 Drawing Sheets

(56) References Cited

U.S. PATENT DOCUMENTS

| | | | |
|---|---|---|---|
| 8,166,101 | B2 | 4/2012 | Shah |
| 8,200,246 | B2 | 6/2012 | Khosravy et al. |
| 8,218,549 | B2 | 7/2012 | Dekel et al. |
| 8,238,696 | B2 | 8/2012 | Dart et al. |
| 2003/0110085 | A1 | 6/2003 | Murren et al. |
| 2004/0001498 | A1 | 1/2004 | Chen et al. |
| 2004/0133599 | A1 | 7/2004 | Warren et al. |
| 2004/0133644 | A1 | 7/2004 | Warren et al. |
| 2004/0148420 | A1 | 7/2004 | Hinshaw et al. |
| 2004/0170155 | A1* | 9/2004 | Omar ............ G06F 17/30905 370/349 |
| 2004/0205770 | A1 | 10/2004 | Zhang et al. |
| 2005/0021354 | A1 | 1/2005 | Brendle et al. |
| 2005/0055465 | A1 | 3/2005 | Sato |
| 2005/0055698 | A1 | 3/2005 | Sasaki et al. |
| 2005/0268032 | A1 | 12/2005 | Sikdar et al. |
| 2006/0112398 | A1 | 5/2006 | Mukkamala et al. |
| 2006/0123010 | A1* | 6/2006 | Landry et al. ............... 707/10 |
| 2006/0212530 | A1* | 9/2006 | O'Farrell et al. ...... G06F 8/20 709/212 |
| 2007/0073808 | A1 | 3/2007 | Berrey et al. |
| 2007/0099640 | A1 | 5/2007 | Khushu et al. |
| 2007/0100834 | A1* | 5/2007 | Landry et al. ............... 707/10 |
| 2007/0260475 | A1* | 11/2007 | Bhanote ...................... 705/1 |
| 2007/0260628 | A1 | 11/2007 | Fuchs et al. |
| 2007/0271275 | A1 | 11/2007 | Fassette et al. |
| 2008/0104133 | A1 | 5/2008 | Chellappa et al. |
| 2008/0120304 | A1 | 5/2008 | Calio et al. |
| 2008/0155525 | A1* | 6/2008 | Ho ............................ 717/168 |
| 2008/0176536 | A1 | 7/2008 | Galluzzo et al. |
| 2008/0270490 | A1* | 10/2008 | Watterott ........ G06F 17/30557 |
| 2009/0036102 | A1 | 2/2009 | Ho |
| 2009/0037395 | A1 | 2/2009 | Ireland et al. |
| 2009/0037430 | A1* | 2/2009 | Mukkamala et al. ......... 707/10 |
| 2009/0059512 | A1 | 3/2009 | Lydon et al. |
| 2009/0171679 | A1 | 7/2009 | Salgado et al. |
| 2009/0177800 | A1 | 7/2009 | Gidron et al. |
| 2009/0187622 | A1 | 7/2009 | Xie |
| 2009/0198772 | A1 | 8/2009 | Kim et al. |
| 2009/0222402 | A1 | 9/2009 | Tysowski |
| 2009/0247134 | A1 | 10/2009 | Jeide et al. |
| 2009/0254601 | A1 | 10/2009 | Moeller et al. |
| 2009/0307284 | A1 | 12/2009 | Welingkar et al. |
| 2010/0011075 | A1 | 1/2010 | Klassen et al. |
| 2010/0169451 | A1 | 7/2010 | Barry |
| 2011/0113121 | A1* | 5/2011 | Sarkar ................ G06F 9/4445 709/218 |
| 2011/0154315 | A1 | 6/2011 | Singh et al. |
| 2011/0161290 | A1 | 6/2011 | Waterman et al. |
| 2011/0161339 | A1 | 6/2011 | Ireland et al. |
| 2011/0161349 | A1 | 6/2011 | Ireland et al. |
| 2011/0161383 | A1 | 6/2011 | Ho et al. |
| 2012/0166446 | A1 | 6/2012 | Bowman et al. |
| 2012/0239704 | A1* | 9/2012 | O'Farrell et al. ............ 707/802 |

OTHER PUBLICATIONS

Office Communications, dated Mar. 7, 2012, for U.S. Appl. No. 12/797,975, filed Jun. 10, 2010, 8 pages.

U.S. Appl. No. 13/275,589, filed Oct. 18, 2011, entitled "Bulk Initial Download of Mobile Databases".

U.S. Appl. No. 13/286,372, filed Nov. 1, 2011, entitled "Entity Triggers for Materialized View Maintenance".

Notification of Transmittal of the International Search Report and Written Opinion, dated Mar. 18, 2010, for PCT Appl. No. PCT/US2009/004343, 11 pages.

Notification of Transmittal of the International Search Report and Written Opinion, dated Jul. 28, 2011, for PCT Appl. No. PCT/US2010/060290, 10 pages.

Notification of Transmittal of the International Search Report and Written opinion, dated Aug. 2, 2011, for PCT Appl. No. PCT/US2010/060293, 11 pages.

Notification of Transmittal of the International Search Report and Written Opinion, dated Aug. 5, 2011, for PCT Appl. No. PCT/US2010/060296, 9 pages.

English Abstract for Korean Patent Pub. No. 10-2003-0072693 A, published Sep. 19, 2003, 1 page, from http://worldwide.espacenet.com.

English Abstract for Korean patent Pub. No. 10-2006-0060629 A, published Jun. 5, 2006, 1 page, from http://worldwide.espacenet.com.

English Abstract for Korean Patent Pub. No. 10-2011-0074059 A, published Jun. 30, 2011, 1 page, from http://worldwide.espacenet.com.

Sinitsyn, A. "A Synchronization Framework for Personal Mobile Servers," *Second IEEE Annual Conference on Pervasive Computing and Communications, Includes Workshop Papers*, Orlando, Florida, pp. 1-5, Mar. 14-17, 2004.

Linthicum, David S., "Chapter 20: EAI Moving Forward," In *Enterprise Application Integration*, Addison-Wesley, XP000002659187, ISBN: 0-201-61583-5, pp. 339-349, May 1, 2000.

Linthicum, David S., "Chapter 11: Database-Oriented Middleware and EAI", In *Enterprise Application Integration*, Addison-Wesley, XP002579155, ISBN: 978-0-201-61583-8, May 1, 2000.

Extended European Search Report, dated Sep. 27, 2011, for European Patent Appl. No. 09803252.7, 7 pages.

Aboulnaga, A., and Aref, W. G., "Window Query Processing in Linear Quadtrees," in Distributed and Parallel Databases, vol. 10, pp. 111-126 (2001).

Aref, W. G. and Samet, H., "Efficient Window Block Retrieval in Quadtree-Based Spatial Databases," in GeoInformatica, vol. 1, Chapter 1, pp. 59-91 (Apr. 1997).

Aref, W. G. and Samet, H., "Estimating Selectivity Factors of Spatial Operations," in Foundations of Models and Languages for Data and Objects, A. Heuer, & M. H. Scholl edition, pp. 31-43 (Aug. 14, 1993).

Fang, Y. et al., "Spatial Indexing in Microsoft SQL Server 2008," in Proceedings of the 2008 ACM SIGMOD International Conference on Arrangement of Data, ACM, New York, NY, pp. 1207-1215 (2008).

Gargantini, I., "An Effective Way to Represent Quadtrees," in Communications of the ACM, vol. 25, No. 12, ACM, New York, NY, pp. 905-910 (Dec. 1982).

Kothuri, R. K. V. et al., "Quadtree and R-Tree Indexes in Oracle Spatial: A Comparison Using GIS Data," in Proceedings of the 2002 ACM SIGMOD International Conference on Management of Data, ACM, New York, NY, pp. 546-557 (2002).

Kriegel, H. P. et al., "Statistic Driven Acceleration of Object-Relational Space-Partitioning Index Structures," in Database Systems for Advances Applications, 14 pages, Jeju Island, Korea, Springer (2004).

Orenstein, J. A., "Redundancy in Spatial Databases," in Proceedings of the 1989 ACM SIGMOD International Conference on Management of Data, ACM, New York, NY, USA, pp. 294-305 (1989).

Samet, H., Foundations of Multidimensional and Metric Data Structures, Morgan Kaufmann, pp. 28-48, 191-193, 204-205, and 211-220 (2006).

Office Action mailed Aug. 10, 2012 in U.S. Appl. No. 12/649,527, filed Dec. 30, 2009, 12 pages.

Office Action mailed Jan. 3, 2012 in U.S. Appl. No. 12/760,233, filed Apr. 14, 2010, 8 pages.

Office Action mailed Jul. 3, 2012 in U.S. Appl. No. 12/760,233, filed Apr. 14, 2010, 9 pages.

Office Communication, dated Jun. 27, 2012, for U.S. Appl. No. 12/797,975, filed Jun. 10, 2010, 9 pages.

Office Communication, dated Apr. 11, 2012, for U.S. Appl. No. 12/813,104, filed Jun. 10, 2010, 16 pages.

Office Communication, dated Sep. 25, 2012, for U.S. Appl. No. 12/813,104, filed Jun. 10, 2010, 14 pages.

Office Communication, dated Aug. 27, 2012, for U.S. Appl. No. 13/286,372, filed Nov. 1, 2011, 12 pages.

(56) References Cited

OTHER PUBLICATIONS

Notification of Transmittal of the International Search Report and Written Opinion, dated May 29, 2012, for PCT Appl. No. PCT/US2011/065197, 9 pages.

U.S. Appl. No. 13/478,181, Lorenz et al., filed May 23, 2012, entitled "Cache Conflict Detection".

U.S. Appl. No. 13/478,185, Lorenz et al., filed May 23, 2012, entitled "Composite Graph Cache Management".

* cited by examiner table_links — 1208

| | | |
|---|---|---|
| uagid | uniqueidentifier | <pk> |
| maintable | varchar(30) | <ak> |
| tablename | varchar(30) | <ak> |
| linktable | varchar(30) | <ak> |
| linkrid | integer | |
| linkwid | integer | |
| association | varchar(64) | <ak> |
| linktype | varchar(20) | |
| linkappname | varchar(100) | |
| linkappdisplayname | varchar(100) | |
| sequence | integer | |
| linklevel | integer | |
| rid | integer | |
| last_modified | timestamp | | click_across — 1210

| | | |
|---|---|---|
| uagid | uniqueidentifier | <pk> |
| colname | varchar(100) | |
| fromtable | varchar(30) | |
| fromuask | integer | |
| totable | varchar(30) | |
| association | varchar(64) | |
| touask | integer | |
| colvalue | varchar(1000) | |
| userid | varchar(128) | |
| dataid | uniqueidentifier | |
| rid | integer | |
| last_modified | timestamp | | request_parameter — 1212

| | | |
|---|---|---|
| uagid | uniqueidentifier | <pk> |
| request_value | varchar(2000) | |
| uausername | varchar(100) | <ak> |
| displayname | varchar(100) | <ak> |
| tablename | varchar(30) | <ak> |
| rid | integer | |
| remote_id | varchar(128) | |
| parameter_group | integer | |
| counter | integer | |
| last_modified | timestamp | |

FIG. 12B

ABSTRACTING DATA FOR USE BY A MOBILE DEVICE HAVING OCCASIONAL CONNECTIVITY

BACKGROUND

1. Field

The present invention relates generally to software development and, more specifically, to abstracting data access in a mobile environment.

2. Description of the Background Art

In order to abstract data access to remote systems on mobile devices, objects are commonly designed in order to present data from various sources, such as relational databases, in an object oriented manner. This also commonly allows for storage of objects in a relational database on the device through object relational mapping. Furthermore, synchronization is often done between the local database and enterprise database. Finally, application developers can reuse these objects in various applications.

This method suffers from the drawback of having to rewrite and redesign the objects when critical system components are changed. Often, several versions of the objects are then required, leading to compatibility issues. An additional drawback is the need for a developer to understand the complexities of relational synchronization technology. While object relational mapping hides most of the mapping details for objects, there is no such help for mobilizing enterprise data as objects for use in a mobile application in a transparent and efficient manner. Finally, with the many types of data sources e.g. Web Services, Enterprise applications, etc., the task becomes even more daunting.

Accordingly, what is desired is a flexible data abstraction methodology.

SUMMARY

Embodiments of the invention include systems, method and computer program products for abstracting data in a remote data source. For example, the method includes the steps of defining the data source, defining a data synchronization methodology for communication with the data source, and providing an abstraction layer for accessing data in the data source. The abstraction layer implements the data synchronization methodology when data is accessed through the abstraction layer.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIGS. 12A and 12B illustrate exemplary metadata tables, according to embodiments of the invention.

Figure 1:
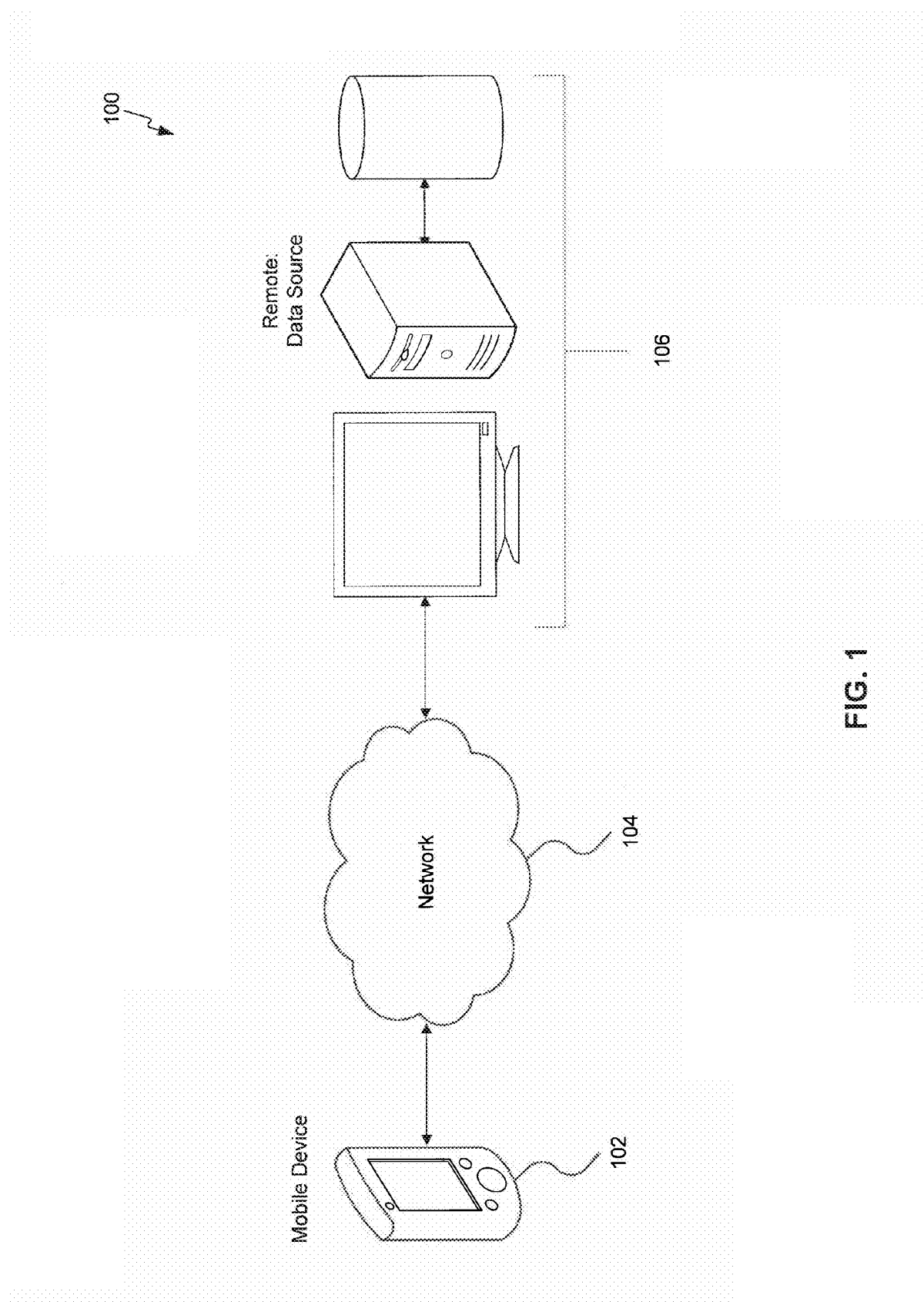
FIG. 1 is an example network architecture in which embodiments of the present invention, or portions thereof, are implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is an example network architecture 100 in which embodiments of the present invention, or portions thereof, are implemented. Network architecture 100 includes a mobile device 102 connected over a network 104 to a remote data source 106, in accordance with an embodiment of the present invention. In accordance with a further embodiment of the present invention, a developer writes a software application for deployment on mobile device 102. The software application is written to occasionally retrieve data from remote data source 106. When the software application attempts to retrieve data from remote data source 106, network 104 may or may not be available. One skilled in the relevant arts will appreciate that mobile device 102 may be any computing device connected over a network, such as network 104, to a remote data source, and need not be a mobile device.

The software development process is described in greater detail herein, with continuing reference to FIG. 1.

II. Software Development Framework

Figure 2:
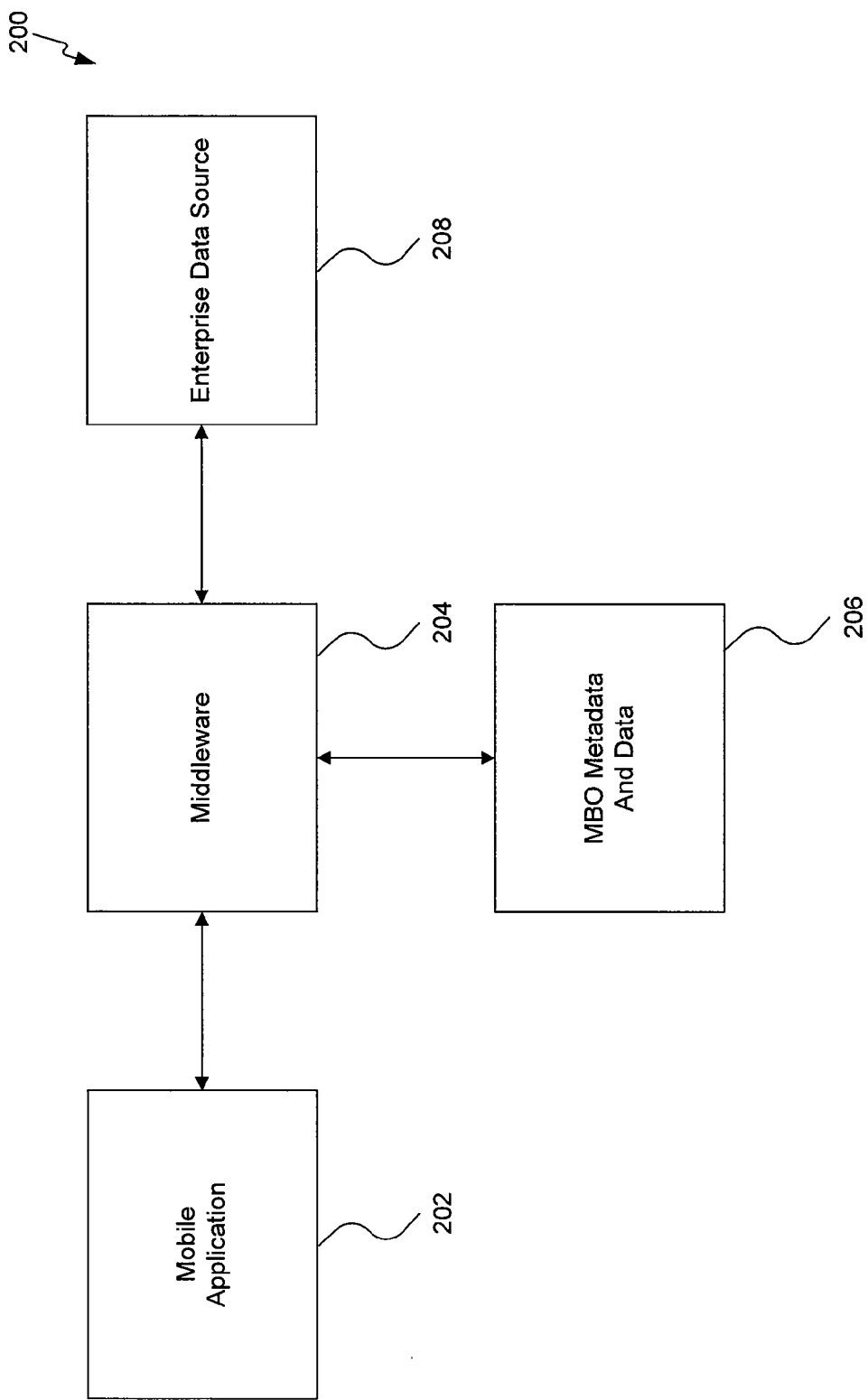
FIG. 2 is an example development framework, in accordance with an embodiment of the present invention.

FIG. 2 is an example development framework 200, in accordance with an embodiment of the present invention. Framework 200 defines a mobile application 202, middleware 204, a mobile business object ("MBO") 206 having associated metadata and data, and an enterprise data source 208, in accordance with an embodiment of the present invention. One skilled in the relevant arts will appreciate that the arrangement shown in framework 200 of FIG. 2 is presented by way of example, and not limitation. In accordance with an embodiment of the present invention, mobile application 202 is operable to run on mobile device 102 of FIG. 1. In accordance with a further embodiment of the present invention, enterprise data source 208 is equivalent to the remote data source 106 of FIG. 1.

Mobile application 202 accesses data in enterprise data source 208 by making calls to an API or other interface of middleware 204, in accordance with an embodiment of the present invention. In accordance with an embodiment of the present invention, middleware 204 is the iAnywhere Mobilink middleware provided by Sybase, Inc. of Dublin, Calif. One skilled in the relevant arts will appreciate that enterprise data source 208 may be any number of types of data sources, including, for example, a relational database or a remote procedure. Middleware 204 facilitates communications, through the use of its API, by an application to one or more data sources, such as data source 208.

MBO 206 is a representation of a subset of data contained in enterprise data source 208, in accordance with an embodiment of the present invention. In accordance with a further embodiment of the present invention, MBO 206 represents multiple data sources simultaneously (i.e. MBO 206 comprises subsets of multiple data sources). MBO 206 is expressed using metadata, which is interpreted by the software of mobile application 202 to facilitate access of data from enterprise data source 208 through middleware 204.

For example, if enterprise data source 208 is a database including a table having telephone directory information for individuals in a corporation, MBO 206 is configured to access the telephone directory information from data source 208 and allow mobile application 202 to access the directory using object oriented methodology without the need to query the enterprise data source 208 itself. This enables mobile application 202 to access data from enterprise data source 208 in a transparent manner.

Figure 3:
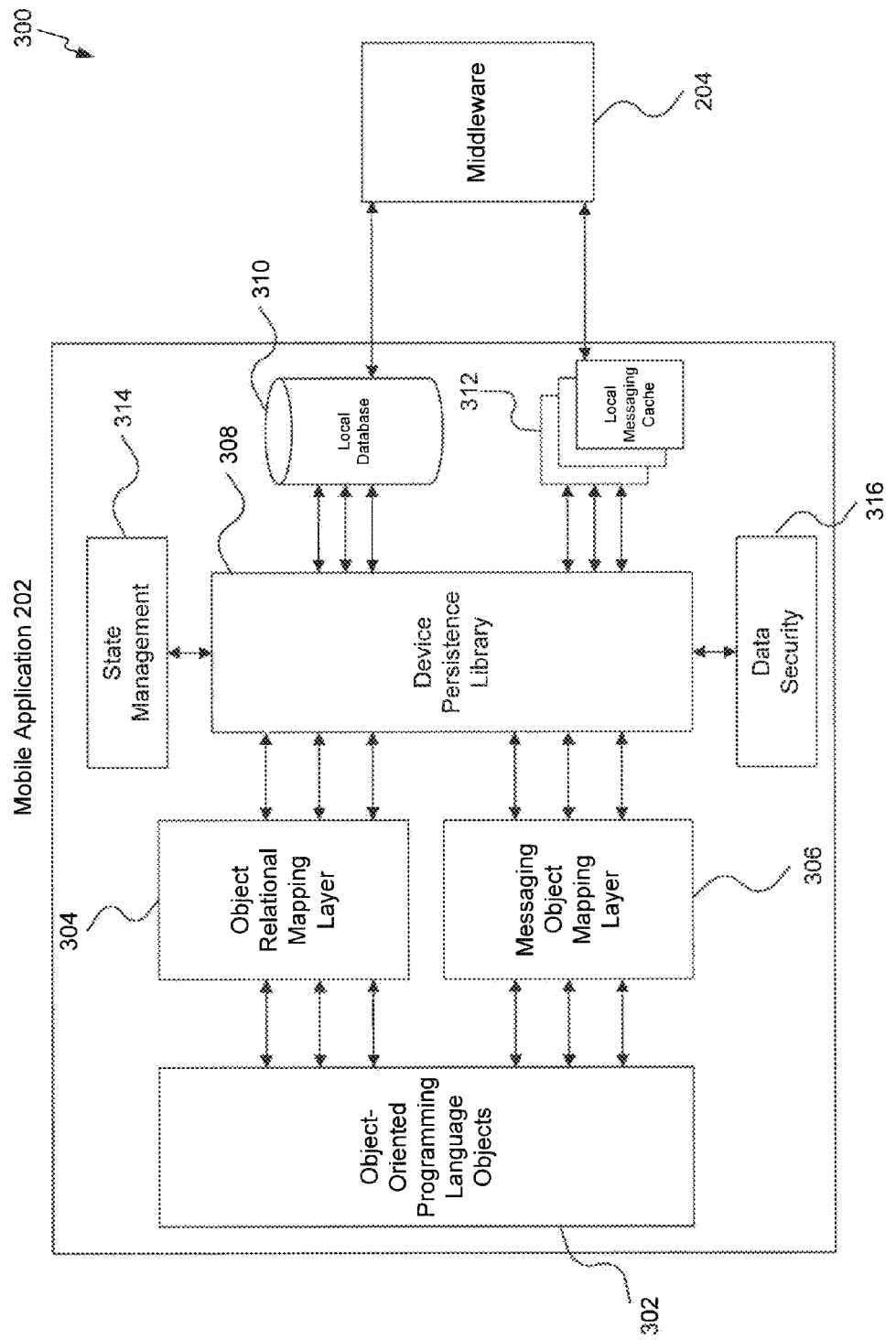
FIG. 3 is an expanded view of a mobile application, in accordance with an embodiment of the present invention.

FIG. 3 is an expanded view 300 of mobile application 202, in accordance with an embodiment of the present invention. Mobile application 202 communicates with enterprise data source 208, as shown in FIG. 2, through middleware 204, in accordance with an embodiment of the present invention. Mobile application 202 is comprised of object oriented programming ("OOP") language objects 302. These OOP objects 302 have an abstracted view of the data being accessed through middleware 204, the abstraction provided by mapping layers, such as object relational mapping layer 304 and messaging object mapping layer 306, in accordance with an embodiment of the present invention.

Additionally, in accordance with an embodiment of the present invention, a device persistence library 308 is provided to persist data at the mobile device 102 on which mobile application 202 is executing. In an embodiment, a local database 310 is provided to store data retrieved from a database data source, and also to store updates being made at the mobile application 202. In an additional embodiment, a local messaging cache 312 is provided to store messaging data at the mobile device 102. These caching facilities 310 and 312 are abstracted to the mapping layer 304 and 306 by the device persistence library.

In an embodiment, not intended to limit the invention, local messaging cache 312 is a messaging conduit that transfers messages between middleware 204 and local database 310. In an embodiment, local messaging cache 312 receives messages from middleware 204 and writes the messages (or data) to local database 310 through persistence library 308.

When mobile application 202 accesses, uses, or interacts with objects 302, it asks messaging object mapping layer 306 to read from local database 310. In an embodiment, local database 310 is updated for changes through messaging object mapping layer 306 and device persistence library 308. Then messages are issued representing the changes through local messaging cache 312 to middleware 204. In this way, for example, local messaging cache 312 acts as a messaging conduit.

Any data received via middleware 204 is considered for retention (or "persistence") by device persistence library 308, and any data intended for transmission to middleware 204 is also considered for retention, in accordance with an embodiment of the present invention. Moreover, mobile application 202 includes a state management module 314 to determine the status of persisted data, as well as a data security module 316 to determine the security characteristics of the persisted data, in accordance with an embodiment of the present invention.

MBO 206 of FIG. 2 operates similarly to mapping layers 304 and 306, except that it is not simply a library compiled as part of mobile application 202. MBO 206 allows OOP objects 302 of application 202 to access data in MBO 206 with similar abstraction as provided by mapping layers 304 and 306, but MBO 206 provides additional functionality to enhance the capabilities of an application deployed in a mobile environment.

III. Defining a Mobile Business Object

Figure 4:
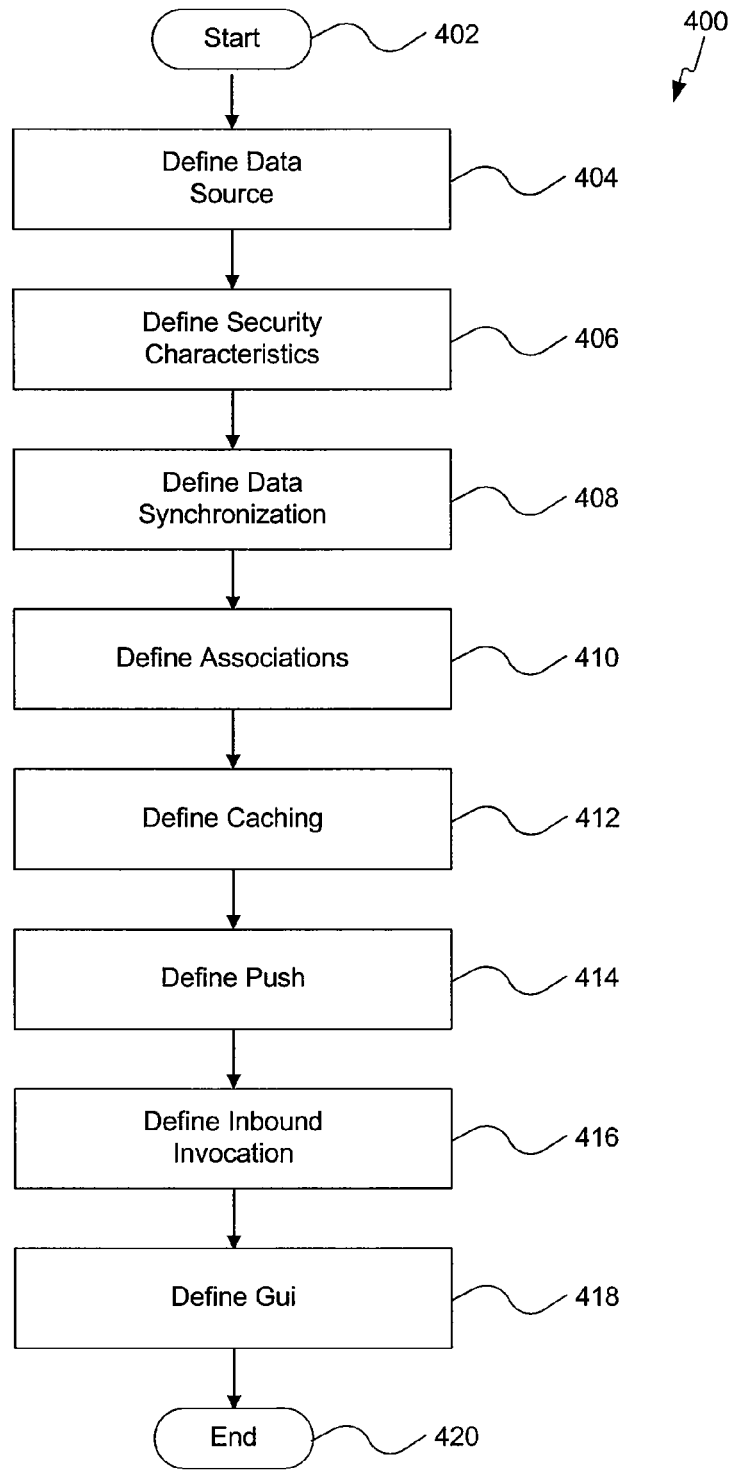
FIG. 4 is a flowchart illustrating steps by which an mobile business object (MBO) is defined, in accordance with an embodiment of the present invention.

FIG. 4 is a flowchart 400 illustrating steps by which an MBO is defined, in accordance with an embodiment of the present invention. One skilled in the relevant arts will appreciate that not all of the following steps are necessary to define an MBO. In accordance with an embodiment of the present invention, the MBO is defined through the use of metadata.

The method beings at step 402 and proceeds to step 404 where a data source is defined. In accordance with an embodiment of the present invention, the data source is an enterprise resource. In accordance with a further embodiment of the present invention, the data source is a service.

The MBO further defines, in accordance with an embodiment of the present invention, any transformation to be performed on data retrieved from, or being sent to, the data source. By defining the data source, attributes and fields accessible by OOP objects 302 of FIG. 3 are also defined, and the MBO can be interacted with using traditional OOP methods, in accordance with an embodiment of the present invention.

At step 406, security characteristics of the data associated with the MBO are defined. This includes, in accordance with an embodiment of the present invention, information about what system components can access the data and how. It also determines, in accordance with a further embodiment of the present invention, whether data is to be erased on the device according to a predefined policy to protect data leakage due to a user misplacing the device. At step 408, data synchronization characteristics of the MBO are defined. This can include, for example, relational data synchronization, such as the synchronization of a local copy of a database with a remote database, and a messaging model.

The method continues to step 410, where any relationships between the instant MBO and other MBOs are defined. At step 412, the method by which data received from the remote data source is defined to a default (or pre-set) caching policy. Any changes to the caching policy, which can include configuring cache intervals and scheduled repeats to updating cached data from an EIS, can be administrative tasks after the MBO definition is deployed.

At step 414, the method by which data pushed by the remote data source to the mobile device is handled is defined. This includes, for example, if and how data should be updated, and how urgent and non-urgent push data is handled. At step 416, inbound invocation methods for the MBO are defined. This enables the remote data source to call the MBO directly to push data, allowing advanced functionality over traditional push updates.

The graphical user interface ("GUI") of the MBO, and the MBO's interaction with the mobile application's own GUI, is defined at step 418. The method ends at step 420.

IV. Exemplary MBO Development Platform

In an embodiment, a development platform based on data replication and operational feedback (or operational replay/relay) can be used to model MBOs. As an example, not intended to limit the invention, a development platform/framework can define binding of MBOs to back-end systems. An exemplary MBO development framework is the SYBASE® Unwired Enterprise Platform (SUP). In an embodiment, middleware 204 executes an MBO model to fetch data from back-end systems and uses replication to mobilize and deploy MBOs to mobile devices. Database replication methods are well known to those skilled in the art and may be, for example, a process of sharing information so as to ensure consistency between redundant resources, such as software or hardware components, to improve reliability, fault-tolerance, or accessibility.

In an embodiment, the MBO development platform allows users to design MBOs once and deploy the MBOs to multiple mobile devices using a common infrastructure.

In an embodiment, not intended to limit the invention, the MBO development platform allows:
- Separation of 'design-time' and 'run-time' environments
- Top-down and/or bottom-up design methodology
- Tooling components
- Enterprise data services
- Mobile middleware (mobile coherency)
- Device-application (UI)
- Use of object-based principles for mobile elements
- Code generation, packaging, and deployment of device code
- Customization using business objects and mobilization APIs in native environments.

Figure 5:
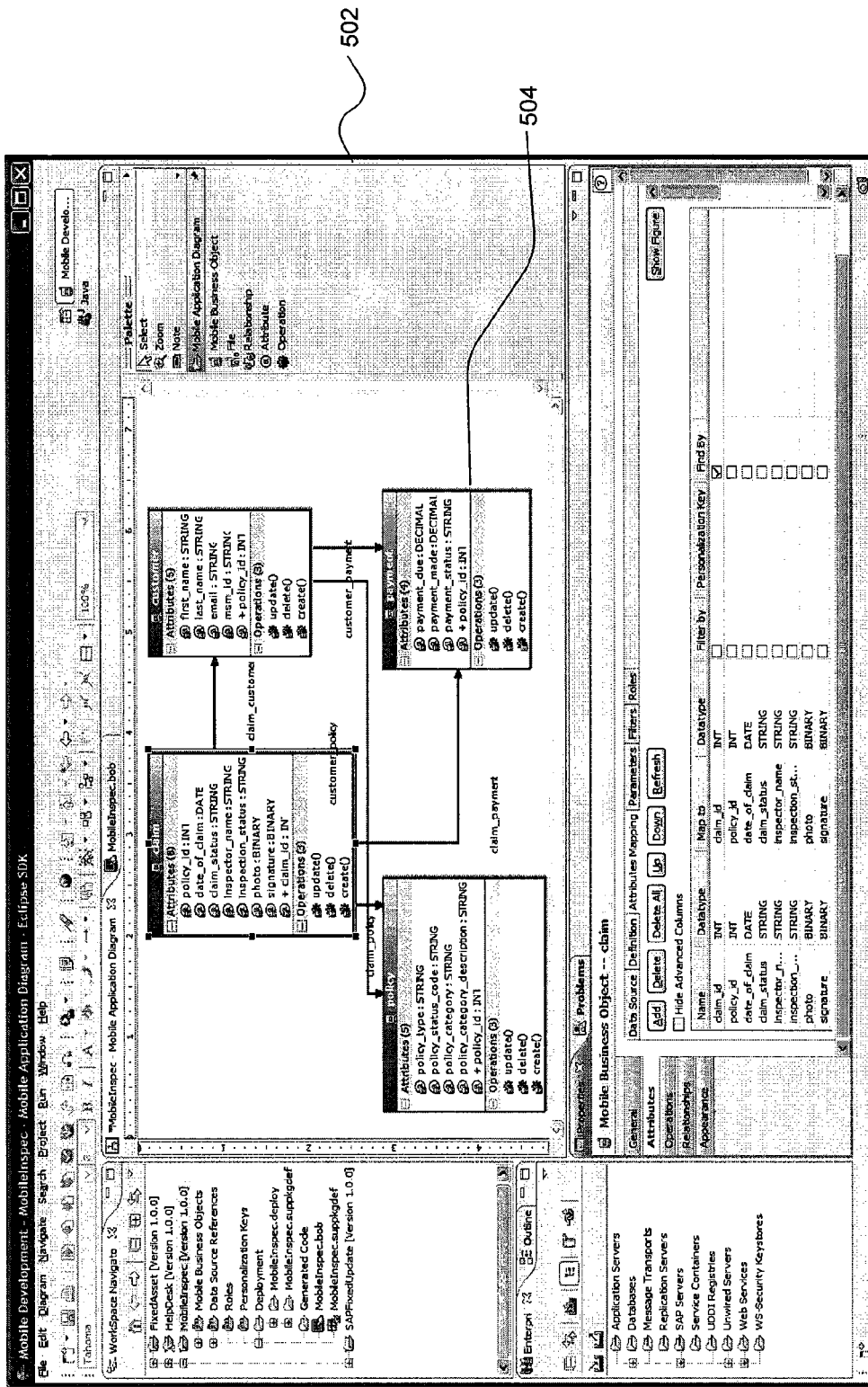
FIG. 5 is a screen-shot illustrating an exemplary user interface of a MBO development platform, according to an embodiment of the invention.

FIG. 5 is a screen-shot illustrating an exemplary user interface of MBO development platform 502, according to an embodiment of the invention.

As shown in FIG. 5, MBO development platform 502 allows design of MBOs through an integrated development environment (IDE).

In an embodiment, MBO development platform 502 includes a designer mode to allow users to design and modify MBOs. As an example, this can be accomplished by using interface 504 to "Define/Edit" MBOs. In the designer mode, MBO development platform 502 generates SQL and code operations for mobile devices and any server side applications. Furthermore, additional operations such as Application Program Interface (API) creation and filtering can be accomplished in the designer mode. In an embodiment, MBO development platform 502 can package and deploy the MBOs to different applications.

In an operation or runtime mode, a runtime engine in MBO development platform 502 performs synchronization/loads and relationship management as specified by MBO runtime parameters. As an example, not intended to limit the invention, MBO runtime parameters are associated with runtime behavior of MBOs and can be specified by a developer.

Figure 6:
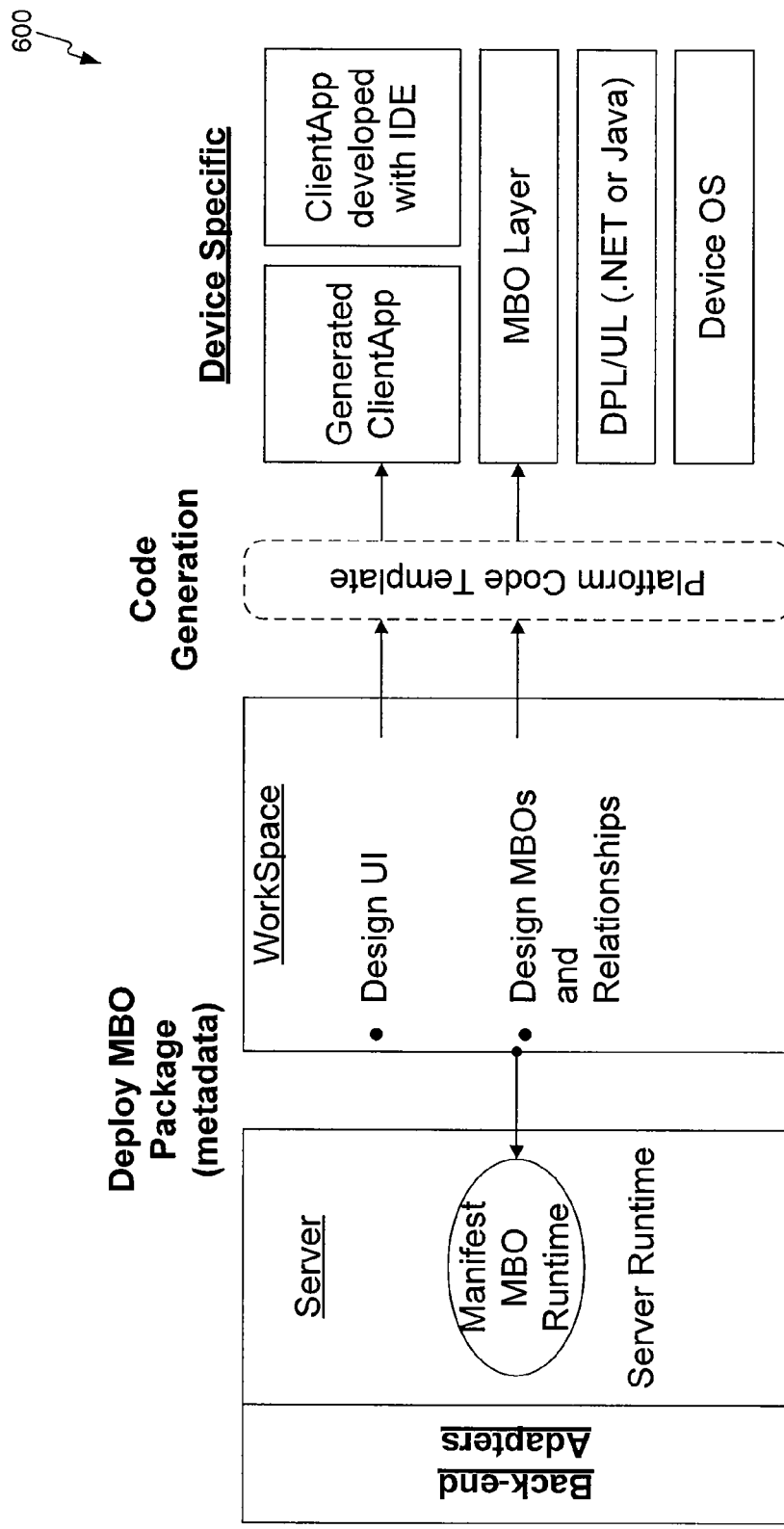
FIG. 6 illustrates an exemplary overall development and deployment framework for MBOs, according to an embodiment of the invention.

FIG. 6 illustrates an exemplary overall development and deployment framework 600 for MBOs, according to an embodiment of the invention. As shown in FIG. 6, a MBO development and deployment framework can include, but is not limited to, a server, workspace and a platform code template. As a purely illustrative example, the server can be a SYBASE® Unwired Enterprise Platform (SUP) server.

In an embodiment, the server provides MBO metadata (e.g. metadata for backend data) to the workspace using MBO runtime and server runtime parameters. The workspace may then use the MBO metadata (or returned information) to design MBOs. In an embodiment, this design process produces MBOs described by the metadata. As an example, the workspace is MBO development platform 502. A platform code template associated with the workspace can generate device specific client applications with a MBO layer.

In an embodiment, the MBO layer manifests as a runtime object and can be used for synchronization and transaction of multiple elements of an application. Development and deployment framework 600 can also be used to generate client side objects, including, but not limited to, C# and JAVA objects.

In an embodiment, input parameters of an MBO can be personalized to filter backend data sets or to provide back-end data to determine what data needs to be processed and returned to development and deployment framework 600.

In an embodiment, MBO attributes and parameters can define a scope of a mobile device-side data store and a server-side cache. Each of the NBO attributes can be mapped to enterprise information systems (EIS) columns, properties of a database operation or any other database structure.

V. MBO Operations

In an embodiment, MBO operations include (but are not limited to) backend tasks that can be carried out within an enterprise environment or through an external service, typically with respect to the MBO attributes. Examples of MBO operations, include, but are not limited to, create, update, and delete (CUD) operations.

MBO parameters (e.g. operation parameters) can be provided to one or more operations and can be linked to upstream parameters or MBO attributes. Furthermore, embodiments of the invention allow the operation parameters to be personalized.

In an embodiment, MBO definitions, such as attributes and operation parameters, are bound or mapped to backend data at design time. Binding or mapping at design time includes creation of EIS connection profiles that can be used to bind data to MBO definitions. As an example, EIS connection profiles can be used to execute backend systems.

VI. Exemplary Read Operation

Figure 7:
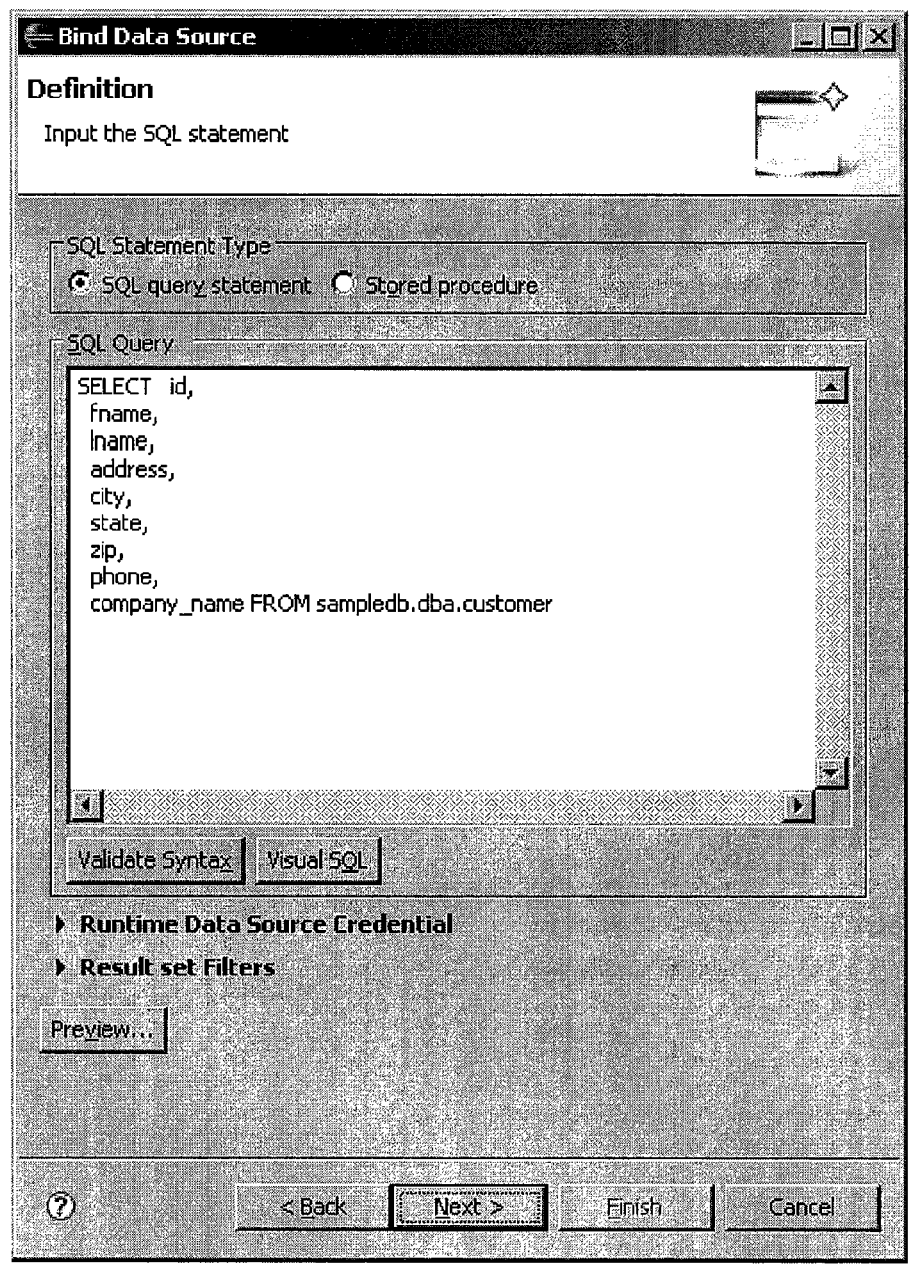
FIG. 7 illustrates an exemplary database connection profile and selection of various columns from a table, according to an embodiment of the invention.

As described earlier, MBO attributes can be mapped to EIS columns or properties. In an embodiment, a server cache (not shown) can be populated by executing a read operation (one or more read/playback parameters can be used). FIG. 7 shows an exemplary database connection profile and selection of various columns from a table, according to an embodiment of the invention.

Figure 8:
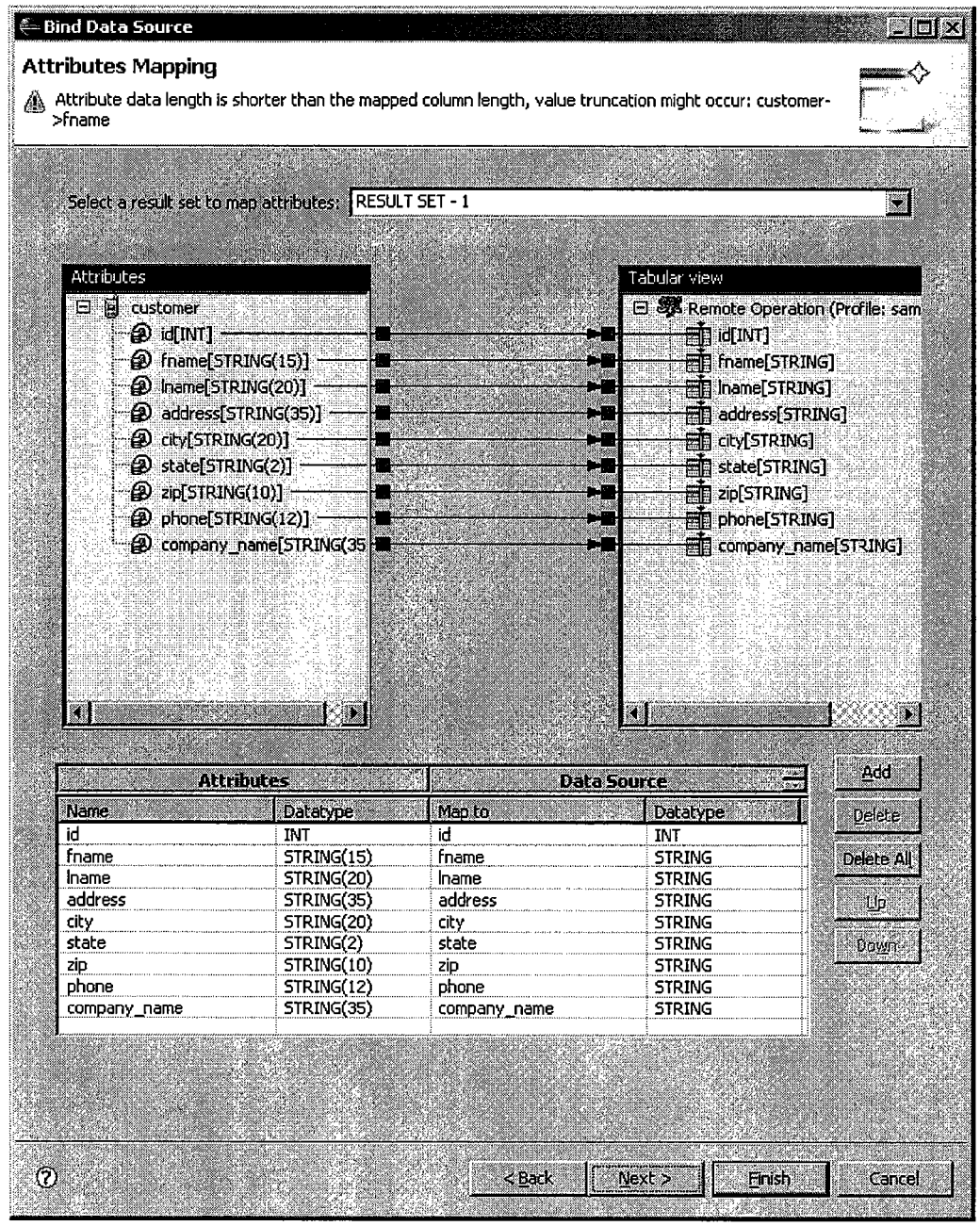
FIG. 8 illustrates an exemplary mapping of MBO attributes to enterprise information systems (EIS) columns, according to and embodiment of the invention.

As shown in FIG. 8, each MBO attribute can be mapped to EIS columns. In an embodiment, MBO attribute names need not match EIS names. MBO development platform 502 can execute a SQL statement defined for a read operation and can store results in a server cache.

VII. Exemplary Create Operation

In an embodiment, MBO operation parameters can be mapped to EIS parameters (or arguments). As described above, a MBO can have create, update, delete, and other operation types. In an embodiment, a MBO can have multiple instances of each operation type.

Figure 9:
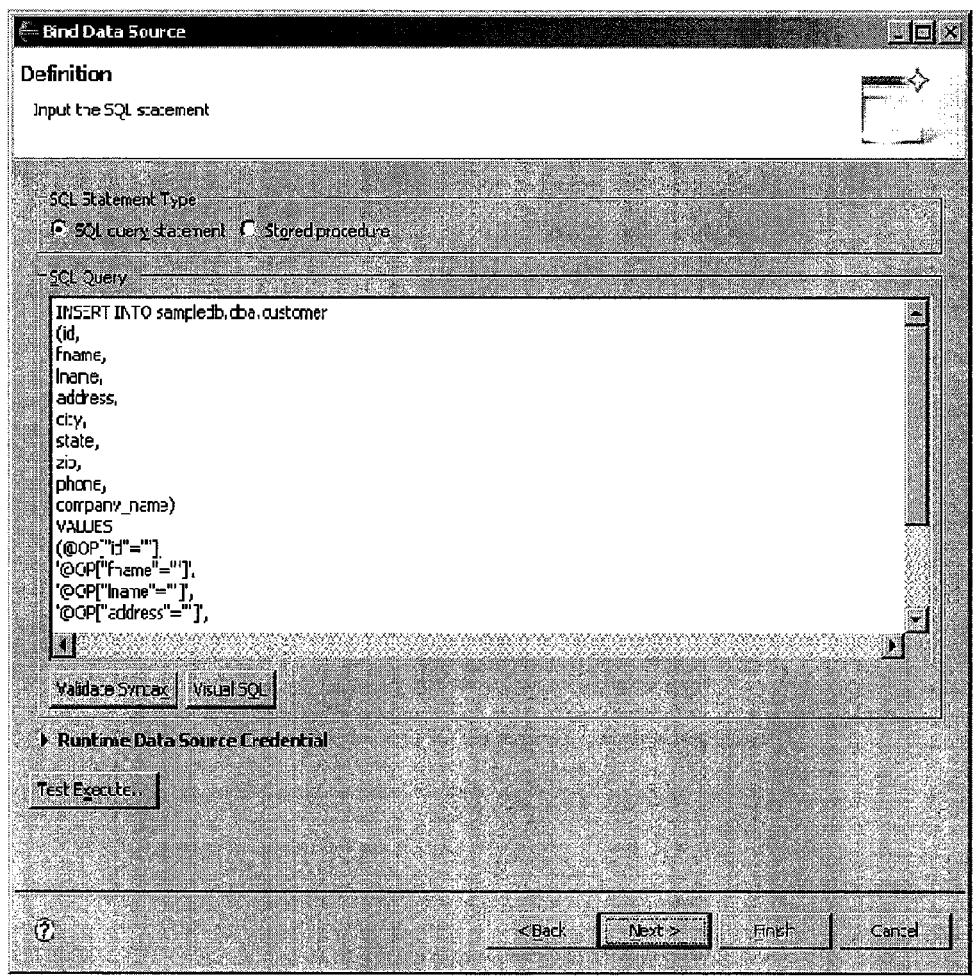
FIG. 9 illustrates an exemplary create operation, according to an embodiment of the invention.
Figure 10:
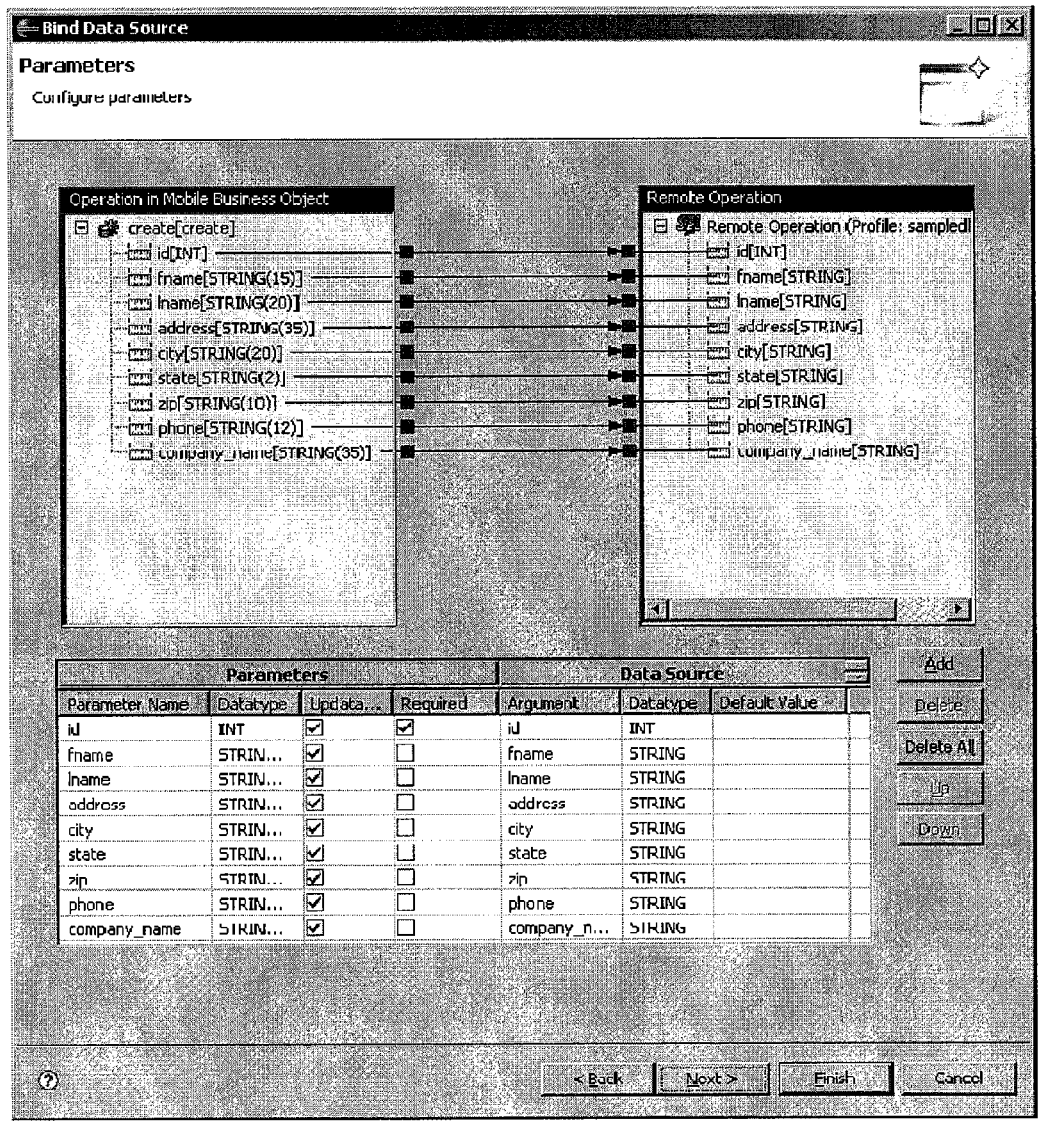
FIG. 10 illustrates an exemplary mapping of operation parameters to EIS parameters, according to an embodiment of the invention.

An exemplary create operation is shown in FIG. 9 which connects to a database profile and inserts data into a table. As shown in FIG. 9, values used in the insert statement use the attribute "@OP", which can mark the values as EIS parameters in MBO development platform 502. The operation parameters are then mapped to EIS parameters as shown in FIG. 10.

VIII. Deployment to Runtime

In an embodiment, once an MBO model is defined and bound to data sources, a package, which includes one or more MBOs, can be deployed to servers (e.g. the server of FIG. 6). In an embodiment, the deployment process maps design time connection profiles used in the MBOs to server connection profiles. As an example, new server connection profiles may be created if they do not exist. Each of the MBOs defined in a package are mapped to database tables (e.g. server caching).

IX. MBO Models

Figure 11:
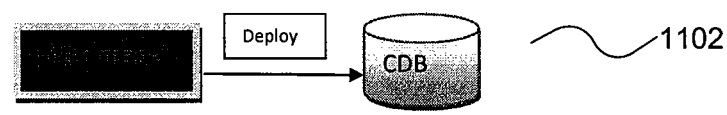
FIG. 11 illustrates an exemplary operation that deploys an MBO model and synchronizes metadata tables to a client database, according to embodiments of the invention.
Figure 11:
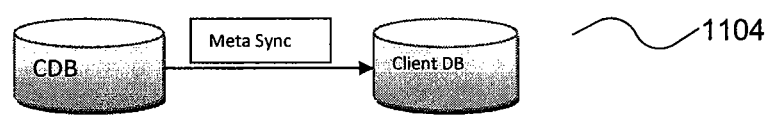

In an embodiment, after an MBO is deployed to a server (e.g. the server of FIG. 6), the server repository or consolidated database (CDB) has a representation of the MBO model. An exemplary operation that deploys an MBO model to a CDB is illustrated in diagram 1102 of FIG. 11.

Meta-Data Tables

In an embodiment, metadata tables store MBO metadata for each MBO deployed to a server. When these metadata tables are synchronized to a client database (e.g. a mobile device client database), the client can use the meta-data tables to generate underlying data tables.

In this way, the client database can mirror the CDB (server consolidated database). An exemplary operation that synchronizes metadata tables to a client database is illustrated in diagram 1104 of FIG. 11.

The separation of metadata tables and data tables, allows dynamic MBO deployment to an existing MBO package. In this way, the entire client database need not be re-created. In an embodiment, the MBO metadata in the metadata tables is used to generate MBO data tables for storing MBO data fetched from a server repository (e.g. CDB).

Figure 12A:
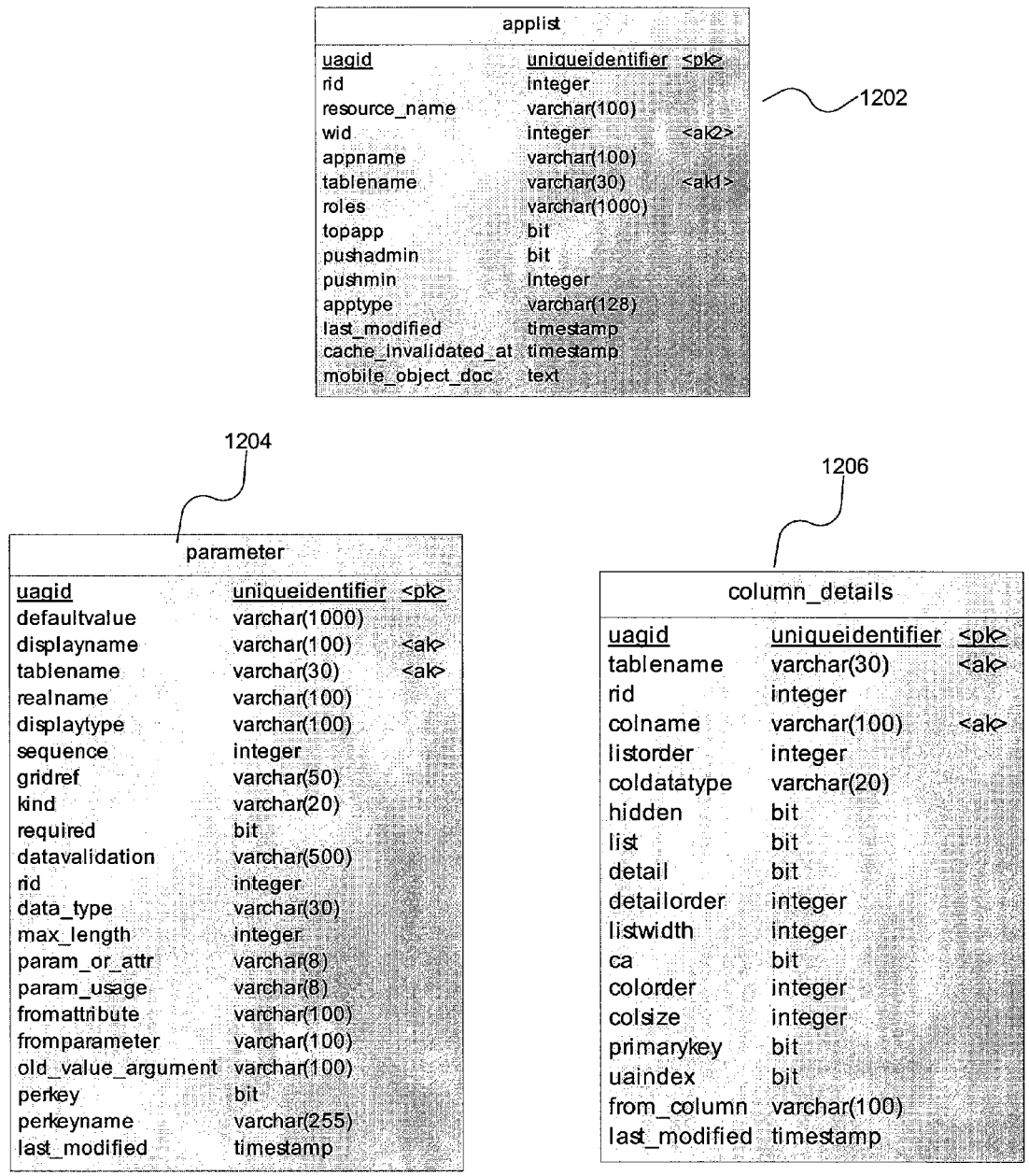

FIGS. 12A and 12B illustrate exemplary metadata tables in accordance with embodiments of the invention. Referring to FIG. 12A, applist 1202 illustrates MBOs that have been deployed and information associated with each MBO. Parameter table 1204 can list all parametric information for read, create, update, delete and other operations. Column details table 1206 can include MBO attributes and meta-data associated with the attributes.

Referring to FIG. 12B, table-links 1208 identifies MBO relationships including links to MBO operations. Click-across table 1210 identifies MBO data relationships and request-parameter table 1212 includes MBO synchronization parameter data used for MBO operations (e.g. read operations).

X. Mobilizing MBOs and MBO Data Flow

In an embodiment, once an MBO model is deployed to a server repository (e.g. CDB), clients can perform a metadata sync to retrieve all deployed MBO metadata. After the metadata sync process, a client generates MBO data tables similar to tables in the CDB.

In an embodiment, during the metadata sync process, the client defines publications for each MBO. As an example, a publication includes one or more database tables. In an embodiment, publications are used to determine a set of tables that are to be synced.

XI. Exemplary Client Stack

Figure 13:
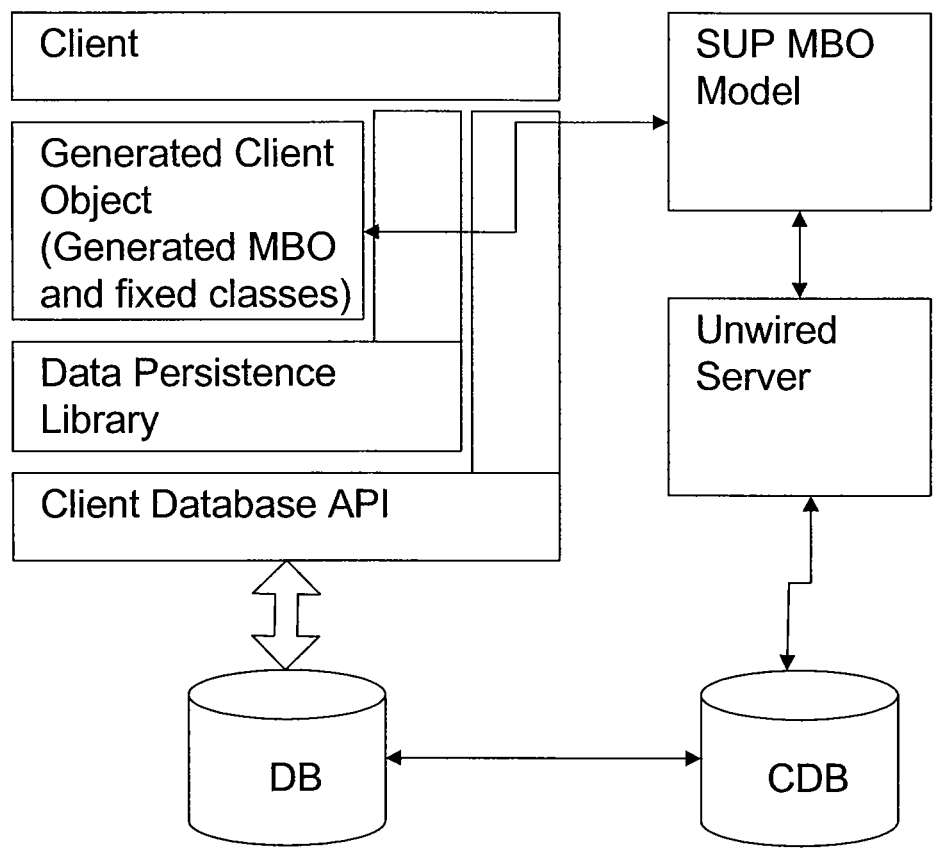
FIG. 13 illustrates an exemplary client stack, according to an embodiment of the invention.

FIG. 13 shows an exemplary diagram of a client stack, according to an embodiment of the invention.

As illustrated in FIG. 13, and according to an embodiment, a tooling layer defines and creates a MBO model and deploys it to a server. A code generator engine uses the MBO model and generates a client object API. In an embodiment, the generated client object's implementation can make use of a data persistence library (DPL) utility layer to handle database interactions on a mobile device. In an embodiment, both generated client objects and the DPL are driven by MBO meta-data.

XII. Interfacing with a Mobile Business Object

Figure 14:
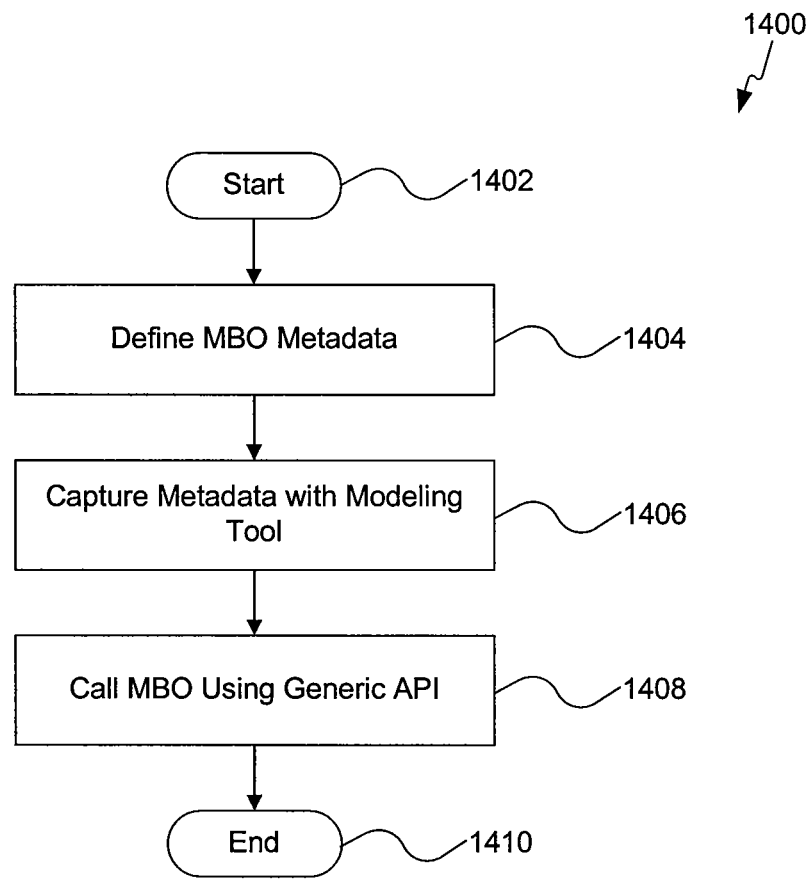
FIG. 14 is a flowchart illustrating steps by which an interface with an MBO is utilized, in accordance with an embodiment of the present invention.

FIG. 14 is a flowchart 1400 illustrating steps by which an interface with an MBO is utilized, in accordance with an embodiment of the present invention. The method starts at step 1402 and proceeds to step 1404 where metadata for the MBO is defined, such as by the method shown in flowchart 400 of FIG. 4, in accordance with an embodiment of the present invention.

The method proceeds to step 1406, where the metadata of the MBO is captured with a modeling tool. This modeling tool is specific to the device on which a mobile application is being deployed, thereby enabling the metadata to be interpreted in a platform-specific manner as necessary, in accordance with an embodiment of the present invention. This further enables new versions of the MBO to be defined by updating the metadata, without the need to account for platform-specific variations.

At step 1408, a generic API for the MBO is called by the application in order to access the data provided by the MBO, and to otherwise interact with the MBO in an object oriented environment. In addition, a generated object specific API for the MBO using the captured metadata is also available, in accordance with an embodiment of the present invention, often providing computational efficiencies when compared with the generic API. The method then ends at step 1410.

XIII. Mobile Business Object State Management

Figure 15:
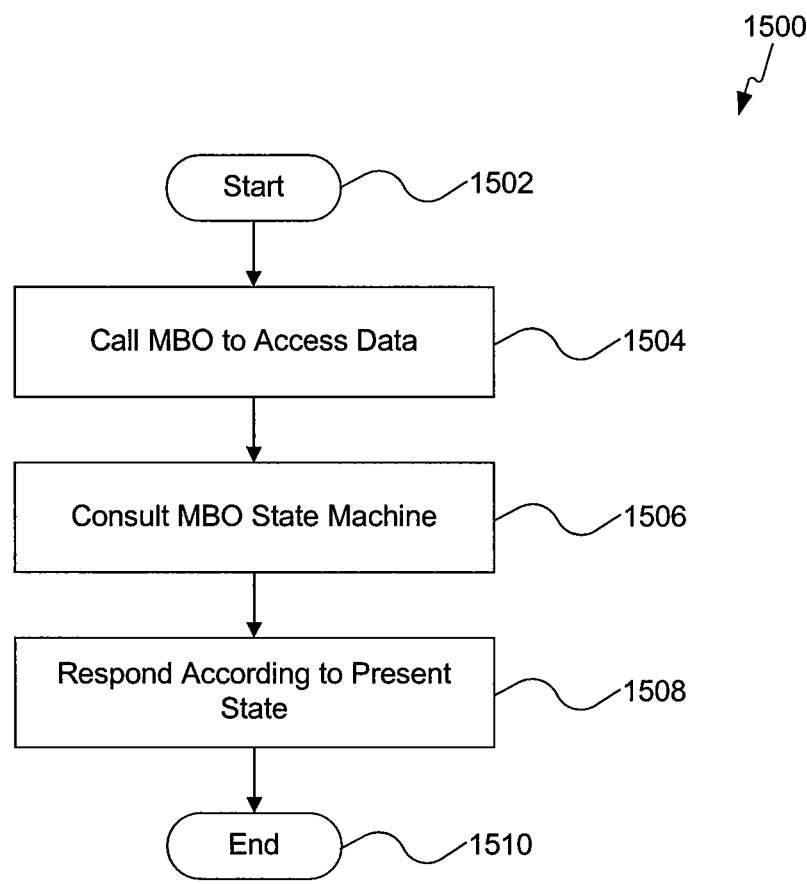
FIG. 15 is a flowchart illustrating steps by which the state of the MBO is saved and utilized, in accordance with an embodiment of the present invention.

FIG. 15 is a flowchart 1500 illustrating steps by which the state of the MBO is saved and utilized, in accordance with an embodiment of the present invention. The method begins at step 1502 and proceeds to step 1504 where an API call to data provided by the MBO is made.

The current state of the MBO is consulted at step 1506, in accordance with an embodiment of the present invention. The MBO is able to update its state, and the current state affects the behavior of the MBO's response. Accordingly, at step 1508, a response to the API call of step 1504 is generated that is consistent with the MBO's state, and the method ends at step 1510.

XIV. Example Computer System Implementation

Figure 16:
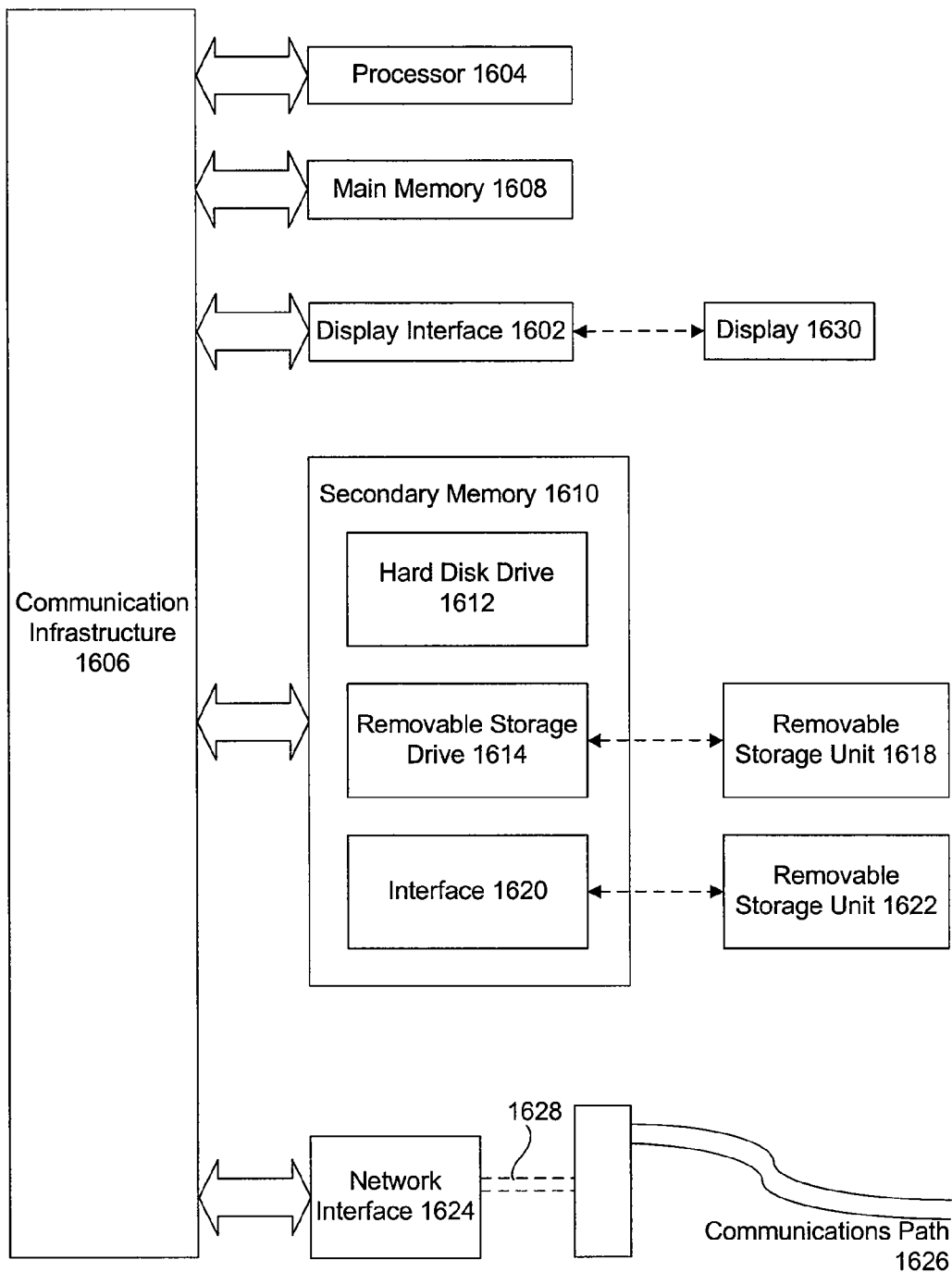
FIG. 16 depicts an example computer system in which embodiments of the present invention may be implemented.

Various aspects of the present invention can be implemented by software, firmware, hardware, or a combination thereof. FIG. 16 illustrates an example computer system 1600 in which the present invention, or portions thereof, can be implemented as computer-readable code. For example, the methods illustrated by flowcharts 400 of FIG. 4, 500 of FIG. 5, and 600 of FIG. 6, can be implemented in system 1600. Various embodiments of the invention are described in terms of this example computer system 1600. After reading this description, it will become apparent to a person skilled in the relevant art how to implement the invention using other computer systems and/or computer architectures.

Computer system 1600 includes one or more processors, such as processor 1604. Processor 1604 can be a special purpose or a general purpose processor. Processor 1604 is connected to a communication infrastructure 1606 (for example, a bus or network).

Computer system 1600 also includes a main memory 1608, preferably random access memory (RAM), and may also include a secondary memory 1610. Secondary memory 1610 may include, for example, a hard disk drive 1612, a removable storage drive 1614, and/or a memory stick. Removable storage drive 1614 may comprise a floppy disk drive, a magnetic tape drive, an optical disk drive, a flash memory, or the like. The removable storage drive 1614 reads from and/or writes to a removable storage unit 1618 in a well known manner. Removable storage unit 1618 may comprise a floppy disk, magnetic tape, optical disk, etc. which is read by and written to by removable storage drive 1614. As will be appreciated by persons skilled in the relevant art(s), removable storage unit 1618 includes a computer usable storage medium having stored therein computer software and/or data. Computer system 1600 may also include a display interface 1602 and a display 1630.

In alternative implementations, secondary memory 1610 may include other similar means for allowing computer programs or other instructions to be loaded into computer system 1600. Such means may include, for example, a removable storage unit 1622 and an interface 1620. Examples of such means may include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to computer system 1600.

Computer system 1600 may also include a communications interface 1624. Communications interface 1624 allows software and data to be transferred between computer system 1600 and external devices. Communications interface 1624 may include a modem, a network interface (such as an Ethernet card), a communications port, a PCMCIA slot and card, or the like. Software and data transferred via communications interface 1624 are in the form of signals which may be electronic, electromagnetic, optical, or other signals capable of being received by communications interface 1624. These signals are provided to communications interface 1624 via a communications path 1626. Communications path 1626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1618, removable storage unit 1622, and a hard disk installed in hard disk drive 1612. Signals carried over communications path 1626 can also embody the logic described herein. Computer program medium and computer usable medium can also refer to memories, such as main memory 1608 and secondary memory 1610, which can be memory semiconductors (e.g. DRAMs, etc.). These computer program products are means for providing software to computer system 1600.

Computer programs (also called computer control logic) are stored in main memory 1608 and/or secondary memory 1610. Computer programs may also be received via communications interface 1624. Such computer programs, when executed, enable computer system 1600 to implement the present invention as discussed herein. In particular, the computer programs, when executed, enable processor 1604 to implement the processes of the present invention, such as the steps in the methods illustrated by flowcharts 400 of FIG. 4, 1400 of FIG. 14, and 1500 of FIG. 15, discussed above. Accordingly, such computer programs represent controllers of the computer system 1600. Where the invention is implemented using software, the software may be stored in a computer program product and loaded into computer system 1600 using removable storage drive 1614, interface 1620, hard drive 1612 or communications interface 1624.

The invention is also directed to computer program products comprising software stored on any computer useable medium. Such software, when executed in one or more data processing device, causes a data processing device(s) to operate as described herein.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for abstracting data in a remote data source for use by a mobile device having occasional connectivity, comprising:
defining object accessible source data based on a remote data source, wherein the object accessible source data is a subset of data stored at the remote data source;
defining a data synchronization methodology for communication with said remote data source;
determining a current state of said object accessible source data;
determining, security characteristics of said object accessible source data, wherein said security characteristics comprise information identifying which, of a plurality of components of said mobile device, accessing the object accessible source data;
providing an abstraction layer configured to allow access to the object accessible source data; and
implementing said data synchronization methodology consistent with the determined current state of the object accessible source data synchronized with and maintained by said mobile device when data is accessed through said abstraction layer.

2. The method of claim 1, further comprising:
defining a method by which said data is provided by said remote data source to said mobile device.

3. The method of claim 1, further comprising:
interfacing with a mobile business object (MBO).

4. The method of claim 3, further comprising:
defining security characteristics of said MBO;
defining data synchronization characteristics of said MBO; and
defining relationships between said MBO and other MBOs.

5. The method of claim 3, further comprising:
defining in-bound invocation methods for said MBO.

6. The method of claim 3, further comprising:
defining metadata for said MBO.

7. The method of claim 6, further comprising:
capturing said metadata with a modeling tool.

8. The method of claim 3, further comprising:
performing an application program interface (API) call to said MBO; and
obtaining a response to said API call, wherein said response is based on a state of said MBO.

9. A system for abstracting data in a remote data source for use by a mobile device having occasional connectivity, comprising:
non-transitory computer readable media containing non-transitory computer code, comprising:
a middleware associated with said remote data source, wherein said remote data source includes defined object accessible source data comprising a subset of data stored at the remote data source;
a mobile business object (MBO) associated with said middleware, wherein said MBO includes at least a subset of data in said remote data source and wherein said MBO is configured to update an associated state, and wherein said associated state includes a persistence of said object accessible source data;
an application program interface (API) configured to request access to data provided by said MBO, wherein said MBO is configured to generate a response to said request consistent with said persistence of said associated state; and
a data security module configured to determine security characteristics of said object accessible source data, wherein said security characteristics comprise information identifying which, of a plurality of components of said mobile device, accessing the object accessible source data.

10. The system of claim 9, wherein the computer code further comprises:
a mobile application associated with said middleware, wherein said mobile application is configured to access data in said remote data source using said API.

11. The system of claim 10, wherein said mobile application comprises:
an object relational mapping layer configured to interact with one or more object oriented programming language objects;
a messaging object mapping layer; and
a device persistence library associated with said messaging object mapping layer configured to store data associated with said mobile application.

12. The system of claim 11, wherein said mobile application further comprises a state management module configured to determine status of said stored data.

13. The system of claim 11, wherein said mobile application further comprises a local database configured to store data retrieved from said remote data source.

14. The system of claim 11, wherein said mobile application further comprises a local messaging cache configured to store messaging data associated with said mobile application.

15. A non-transitory computer-readable medium having control logic stored therein, said control logic enabling one or more processors to abstract data, according to a method, in a remote data source for use by a mobile device having occasional connectivity, the method comprising:
defining object accessible source data based on a remote data source, wherein the object accessible source data is a subset of data stored at the remote data source;
defining a data synchronization methodology for communication with said data source;
determining a current state of said object accessible source data;
determining security characteristics of said object accessible source data, wherein said security characteristics comprise information identifying which, of a plurality of components of said mobile device, accessing the object accessible source data;
providing an abstraction layer configured to allow access to the object accessible source data; and
implementing said data synchronization methodology consistent with the determined current state of said object accessible source data synchronized with and maintained by said mobile device when data is accessed through said abstraction layer.

16. The computer-readable medium of claim 15, the method further comprising:
defining a method by which said data is provided by said remote data source to said mobile device.

17. The computer-readable medium of claim 15, the method further comprising:
interfacing with a mobile business object (MBO).

18. The computer-readable medium of claim 17, the method further comprising:
defining security characteristics of said MBO;
defining data synchronization characteristics of said MBO; and
defining relationships between said MBO and other MBOs.

19. The computer-readable medium of claim 17, the method further comprising:

defining in-bound invocation methods for said MBO.

20. The method of claim 1, further comprising defining a transformation to be performed on data received from or sent to the remote data source.

21. The method of claim 1, wherein the object accessible data source data further comprises a subset of data stored at an additional remote data source.

22. The method of claim 1, further comprising defining a method of pushing data from the remote data source to the mobile device.

* * * * *